United States Patent
Corriston

[15] 3,645,564
[45] Feb. 29, 1972

[54] INSULATED CONDUIT-FITTING ASSEMBLY

[72] Inventor: Winfield F. Corriston, Far Hills, N.J.
[73] Assignee: Johns-Manville Corporation, New York, N.Y.
[22] Filed: Jan. 12, 1970
[21] Appl. No.: 2,155

[52] U.S. Cl. ..............................285/47, 285/61, 285/156, 285/177, 285/179, 285/351
[51] Int. Cl. .......................................................F16l 59/16
[58] Field of Search ..............285/47, 53, 351, 187, DIG. 10, 285/156, 61, 177, 179; 138/149

[56] References Cited

UNITED STATES PATENTS

| 3,492,029 | 1/1970 | French et al. | 285/47 |
| 3,351,361 | 11/1967 | Martin | 285/47 |
| 3,184,958 | 5/1965 | Eaton | 138/149 X |
| 2,451,146 | 10/1948 | Baker et al. | 138/149 X |
| 2,726,104 | 12/1955 | Boitnott et al. | 285/DIG. 10 |

FOREIGN PATENTS OR APPLICATIONS

| 447,735 | 3/1968 | Switzerland | 285/47 |
| 1,391,796 | 2/1965 | France | 285/47 |

Primary Examiner—Thomas F. Callaghan
Attorney—John A. McKinney and Robert M. Krone

[57] ABSTRACT

An insulated conduit-fitting assembly comprising an outer casing having a support shell secured to its inner edge. An inner transfer pipe is positioned within the outer casing and is surrounded by insulation material filling a substantially annular space. One end of the inner transfer pipe is recessed within the outer casing, with the recessed end of the inner transfer pipe having a coupling assembly mounted thereon. At least one end of the inner transfer pipe extends beyond the edge of the outer casing with each of the extended ends of the inner transfer pipe cooperating with an end sealing ring. The support shell is positioned within the outer casing so that it is separated from the ring coupling assembly and the end seal by insulation material.

7 Claims, 5 Drawing Figures

Patented Feb. 29, 1972

INVENTOR
WINFIELD F. CORRISTON
BY John A. McKinney
ATTORNEY

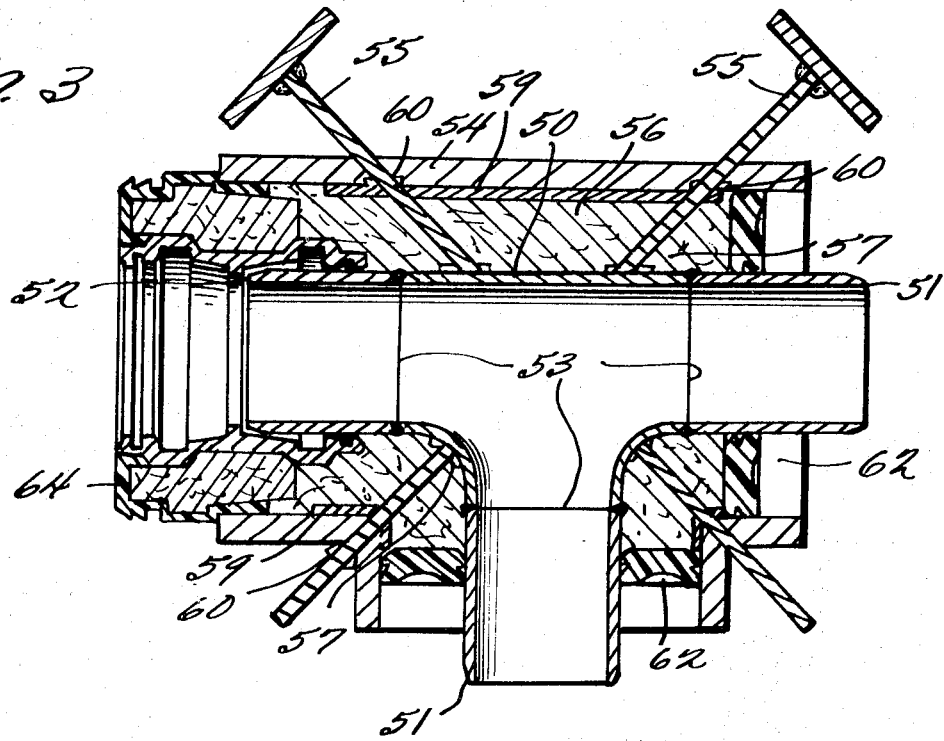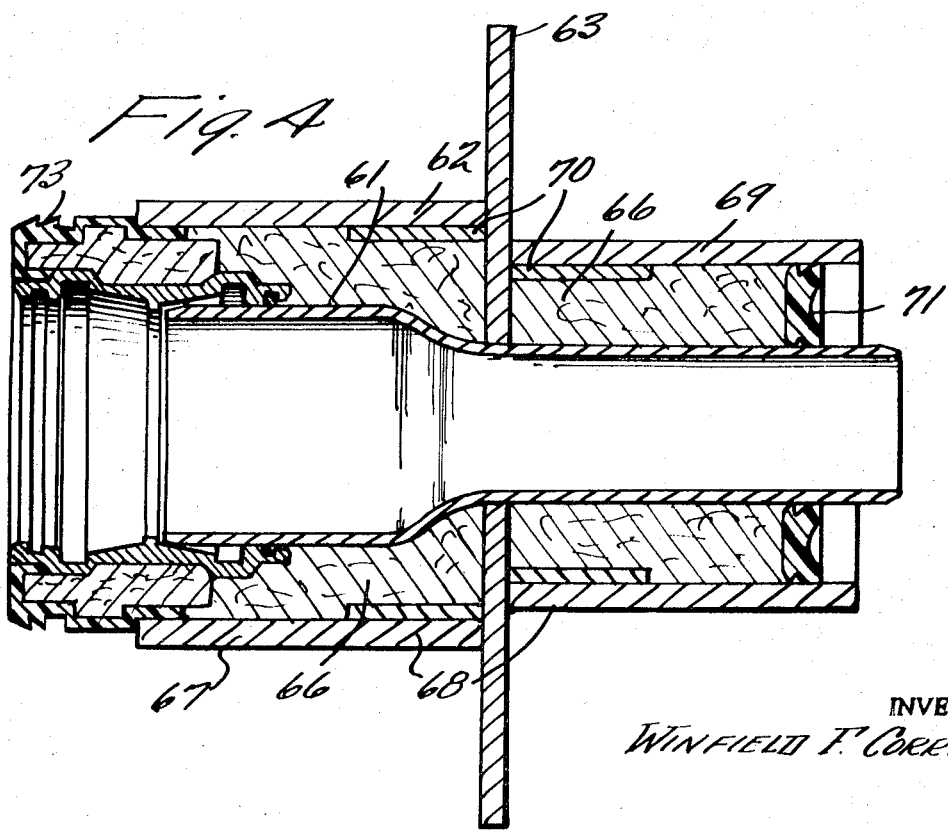

Patented Feb. 29, 1972

INVENTOR
WINFIELD F. CORRISTON

BY John A. McKinney
ATTORNEY

INSULATED CONDUIT-FITTING ASSEMBLY

The present invention relates to multiple insulated pipe fittings forming an assembly which provides means for joining together sections of insulated conduit to present a continuous passage of insulated conduit. All of the insulated fittings used in the assembly are constructed to maintain the temperature of the fluid passing through the assembly at predetermined values with minimum temperature loss resulting in the additional benefit of a longer active life for the seals of the fittings.

The use of the present insulated pipe fittings is particularly advantageous in that the use of such fittings provides an accurate estimation of the cost which will be incurred in installing the fitting and in the actual construction of the fittings when bringing the fittings together to form a continuous insulated conduit. Additional benefits are incurred from the lower costs and ease of manufacture of the insulated pipe fittings.

By using the present invention a continuously formed insulated fluid conducting conduit assembly will be created having a core of conventional section of inner transfer pipe through which the fluid or liquid may pass.

The present invention utilizes the prefabrication of fittings so that the fitting assembly may be interconnected with insulated conduits in the field without the use of special tools, equipment or expertice.

Prior to the present invention it was felt necessary to have a continuous pipe welding so that the insulated conduit would maintain the correct flow of fluids at variable temperatures. The present invention overcomes the need for continuous pipe welding thus simplifying the installation of insulated conduits.

Further aspects of the invention are exemplified in the following specification and claims and are illustrated in the accompanying drawings in which:

FIG. 3 shows a cross-sectional view of a T-shaped embodiment of the insulated conduit fitting;

FIG. 4 shows a cross-sectional view of transfer pipe reducer embodiment of the invention.

Figure 1:
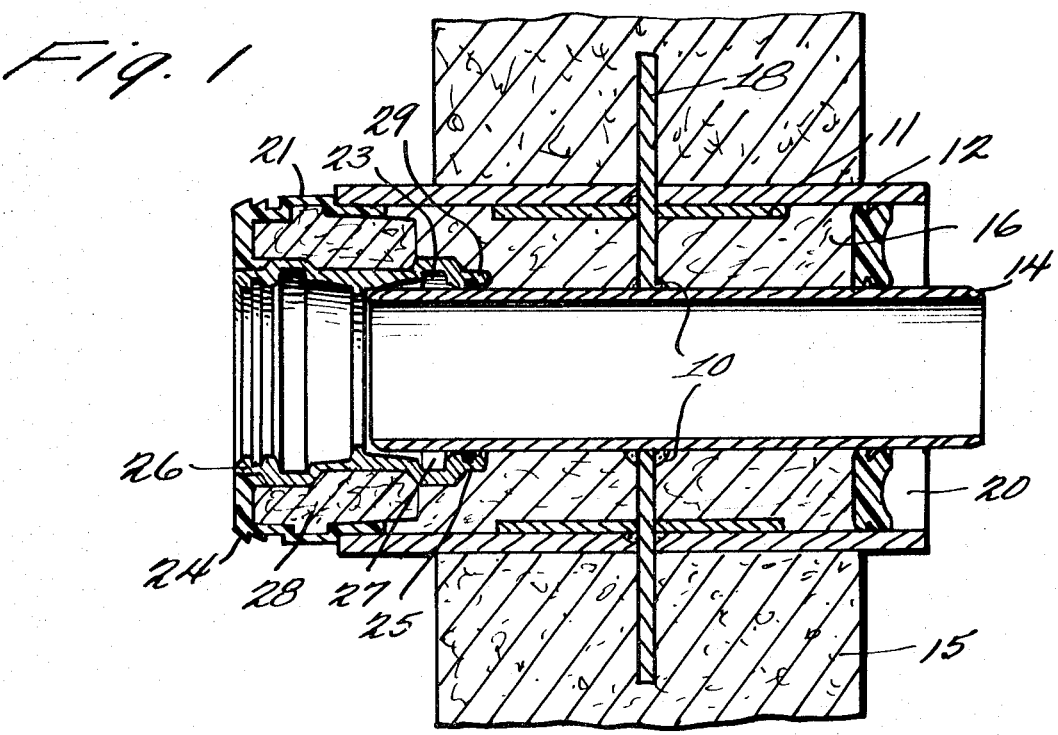
FIG. 1 shows a cross-sectional view of an insulated conduit fitting assembly made in accordance with the present invention.

As shown by FIG. 1, the insulated conduit fitting assembly comprises an outer casing 12 having an inner transfer pipe 14 positioned within. The inner transfer pipe 14 is surrounded by a layer of insulation material filling an area bounded by the outer surface of inner transfer pipe 14 and the inner surface of the outer casing 12 and support shell 11. One end of the inner transfer pipe 13 extends beyond the outer insulated pipe or outer casing 12 where it cooperates with an end ring 20 and the other end of the transfer pipe is recessed within the outer casing 12 and has a coupling assembly mounted thereon. Extending from the inner transfer pipe 14 is a steel anchor 18 which is welded or suitably secured to the inner transfer pipe 14 at 10, so that a rigid structure is formed. In the preferred embodiment the anchor 18 extends perpendicularly from the inner transfer pipe 14. If desired, the anchor 18 can also be secured to a support shell 11 by welding or other suitable means. The anchor 18 is preferably a rectangular plate which has a central hole or aperture which permits it to be slid over the inner transfer pipe 14 during the assembly of the parts of the insulated fitting. The area of the anchor 18 is substantially greater than the cross-sectional area of the outer casing 12 causing the anchor to extend outward from the inner transfer pipe 14 through the annular insulation material 16, steel support shell 11 and outer casing 12 where it extends from the outer casing so that it may be inserted into concrete or anchoring material 15.

When the fitting is anchored or secured, insulated concrete or suitable material 15 is poured or cast about the outer casing 12 embedding the anchor 18 and preferably extending beyond the area in which the insulated fitting assembly is placed.

The anchor 18 can have any desired shape as for example, but not way of limitation, circular, semicircular, or polyangular. The inner transfer pipe 14 is offset from the outer casing 12 with one end of the inner transfer pipe 14 extending beyond the end of outer casing 12, and the other end of transfer pipe 14 being recessed within the outer casing 12. An annular end seal 20 is inserted or placed around the extended end section of the inner transfer pipe 14 so that the end sealing ring 20 abuts or contacts insulation material 16, the outer surface of inner transfer pipe 14 and the inner surface of outer casing 12. Mounted on the recessed end section of the inner transfer pipe 14 is a coupling assembly 21 which seals on end of the pipe conduit fitting assembly with an insulated pipeline when the two are joined or coupled together. The coupling assembly 21 is comprised of a metal coupling 26, an insulated lock block 28 which fits within the structure of metal couplings 26 and a coupling end seal 24 which substantially surrounds one end section of insulated lock block 28 and engages the inner surface of an end portion of the outer casing 12. A high temperature sealing ring or gasket 27 is seated in an annular groove 23 of metal coupling 26 and an O-ring 25 is seated in an annular groove 29 located near the end of metal coupling 26. Both the sealing ring or gasket 27 and O-ring 25 cooperate with the metal coupling 26 to form a seal with the outer surface of inner transfer pipe 12. While the high-temperature sealing ring or gasket 27 is preferably constructed of Teflon and O-ring 25 of rubber any resilient material can be used which will not be adversely affected by the temperature and pressure of the transferred fluid. Preferably, the lock block 16 is constructed of an insulation material but can be constructed of any material which can be suitably used in he insulated fitting assembly. The support shell 11 provides additional support and reinforcement to the outer casing 12 and consequently the entire fitting. The support shell 11 is preferably constructed of steel, although other materials can be used. It should be especially noted that the annular support shell 11 terminates in insulation material 16 before it contacts or engages either the end seal 20 or the coupling assembly 21. This specific construction of the support shell 11 keeps the temperature from being transmitted from the inner transfer pipe 14 through the steel support shell 11 to either of the seals 20 or 21. This construction overcomes a difficulty which can be encountered in insulated fittings in that previous seals can be destroyed by the heat or temperature changes during continuous use of the insulated conduit.

Figure 2:
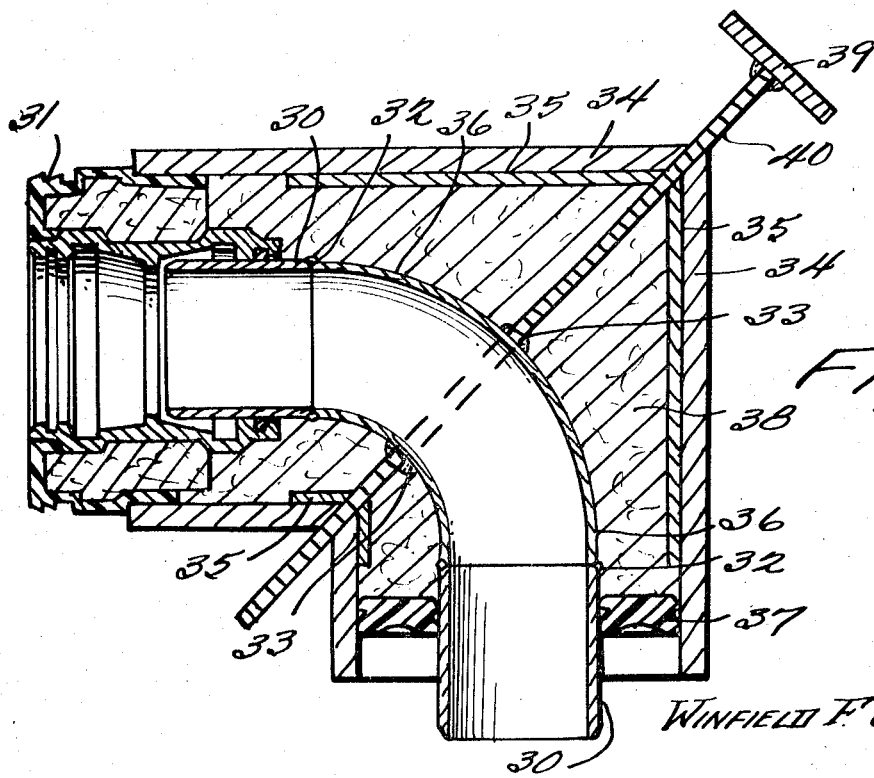
FIG. 2 shows a cross-sectional view of an L-shaped embodiment of the insulated conduit fitting.

In another embodiment of the present invention as shown by FIG. 2, which is commonly referred to as an L-fitting, a standard curved inner transfer pipe 36 is used onto which two short steel nipples 30 are welded as shown at 32. However, if desired, a one-piece curved inner transfer pipe can be used. An L-shaped outer casing or plurality of outer casings 34 surround the inner transfer pipe 36 and meet together at right angles to form the L-shaped fitting. The annular area formed by the outer casing 34 and inner transfer pipe 36 is filled with insulation material 38 which separates and holds the inner transfer pipe 36 in a secured insulated position relative to the outer casing 34. Secured to or contacting the inner surface of the outer casing or casing 34 are support shells 35. While each support shell 35 is generally annular in cross section it is constructed to fit against anchor 40 so that one end is mintered. The anchor 40 is slipped into place as previously described in the embodiment shown by FIG. 1 where it is preferably welded at 33 to the inner transfer pipe 36. If desired, the anchor 40 may be additionally secured to the support shell 35 and can have a boiler plate 39 secured thereto. However, anchor 40 can be secured to the inner transfer pipe in any desired manner. Preferably, the steel support shells 35 which contact the inner surface of the outer casing 34 extend from the anchor 40 towards the respective ends of the outer casing or casings 34 where they terminate short of the end seal 37 and coupling assembly seal 31, and are separated from those seals by insulation material 38. As previously mentioned, the extended end of the inner transfer pipe 32 with extension nipple 30 is provided with an end sealing ring 37 which contacts the insulation material 38, the outer surface of the inner transfer pipe 36 or nipple 30 and the inner surface of the outer casing 34. The recessed end of inner transfer pipe 36 or nipple 30 is provided with a coupling assembly seal 31 having identical construction to the coupling assembly previously shown in FIG. 1.

FIG. 3 discloses another embodiment of the invention commonly called a T-shaped fitting. In this embodiment an inner transfer pipe 50 of a T configuration is surrounded by an outer casing 54 of substantially the same configuration. Steel nipples 51 or nipples of the same material as inner transfer pipe 50 are secured to inner transfer pipe 50 by welding or other suitable means 53. If desired, the T-shaped inner transfer pipe can be a single piece of unified construction. Insulation material 56 separates and secures the outer casing and inner transfer pipe in relative positions. A plurality of anchors 55 extend through outer casing 54 at angles of approximately 45° through the steel support shells 59 and the insulation material 56 where they are constructed to surround inner transfer pipe 50. The anchors 55 are welded to the inner transfer pipe 50 at 57 and are, preferably, further secured by suitably means such as welding to the steel support shells 59 at 60. The steel support shells 59 extend past the plurality of anchors 55 along the inner surface of the outer casing 54 but stop short of contacting end seals 62 which are placed in the extended ends or nipples 51 of the inner transfer pipe 50 in the same manner as previously described and a coupling assembly 64 which is mounted on the recessed end or nipple 51 of the T-shaped inner transfer pipe. The coupling assembly 64 is of the same construction and works in the same manner as previously described in the discussion of the embodiment of FIG. 1.

FIG. 4 shows another embodiment of the invention which is commonly called a reducing fitting in which two different sized insulated conduits may be fitted together as long as the fitting assembly has an inner transfer pipe having abutting end segments of a similar or substantially equal diameter with respect to the inner transfer pipe to which it is joined or fitted. The reducer fitting has a standard bell-shaped inner transfer pipe 61 having one end of a diameter that it will fit a standard inner transfer pipe of an insulated conduit. The bell shaped end of inner transfer pipe 61 has a diameter of such a size that it will fit a larger size insulated conduit than its other end. The inner transfer pipe 61 is, preferably, secured or welded to an anchor plate 63 which has been placed over the inner transfer pipe in the previously described manner. The bell shaped section of inner transfer pipe 61 is surrounded by a layer of insulation material 66 which contacts and is surrounded by an outer casing 68. The outer casing 68 preferably is in a plurality of sections with a larger diameter section 62 surrounding the bell shaped end of the inner transfer pipe 61 and a smaller diameter section 69 surrounding the other end of the transfer pipe. Sections 67 and 69 each have one end which abuts anchor 63. A plurality of steel support shells 70 are secured to anchor plate 63 preferably by welding. It is noted that the steel support shells 70 have different diameters to correspond to the respective outer casing section. The shells are suitably secured to the edge of the anchor plate 63 and extend from the anchor plate 63 short of contacting the end seal 71 and coupling seal assembly 73. A coupling assembly or coupling seal assembly 73 of the same construction as has previously been described is placed or inserted onto the bell-shaped end of the bell-shaped transfer pipe 61 and an end seal 71 is placed or inserted on the extended end of the bell-shaped transfer pipe. Naturally the respective seals can be reversed if such a fitting is desired.

Figure 5:
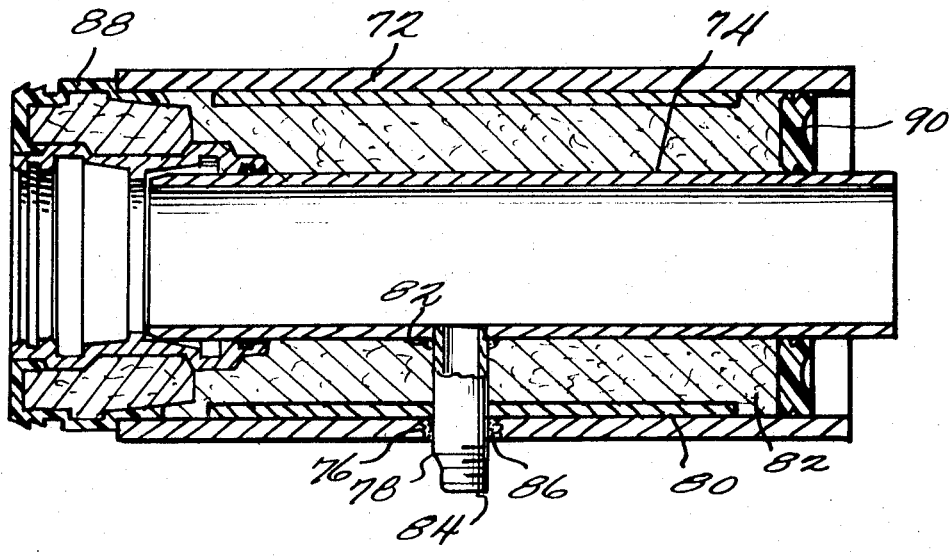
FIG. 5 discloses a cross-sectional view of an accessory fitting embodiment of the invention.

Another embodiment which is shown in FIG. 5 is an accessory fitting. The accessory fitting is comprised of an outer casing 72 having an aperture 76 therethrough. An inner transfer pipe 74 having an auxiliary transfer extension 78 secured thereto is inserted into outside casing 72 with the auxiliary transfer extension being pushed through aperture 76. If a support shell 80 is utilized with the embodiment it must have an aperture therethrough which is in alignment with aperture 76 of outer casing 72. Auxiliary extension 78 is secured to the inner transfer pipe 74 by suitable means for example welding 82. It should be noted that the total length of the auxiliary transfer extension 78 as measured from the outside surface of inner transfer pipe 74 to the extended end of auxiliary transfer extension 78 is less than the diameter of the inside surface of outer casing 72 minus the diameter of the outer surface of the inner transfer pipe 74. It is noted that if an annular support shell 80 is used that the length of the auxiliary transfer extension is computed from the diameter of the inner surface of support shell 80. In constructing the accessory fitting the inner transfer pipe 74 with auxiliary extension 78 secured thereto is slid into the outer casing 72 until the end of auxiliary transfer extension 78 is axially aligned with aperture 76 wherein the auxiliary transfer extension 78 is then extended through aperture 76 until it protrudes outside the outside surface of outer casing 72. Insulation material 82 is then inserted into the annular area formed by the outside surface of inner transfer pipe 78 and auxiliary transfer extension 78 and the inside surface of outer casing 74. If a support shell 80 is used then of course the annular area is decreased. The insulation material 82 is allowed to harden so that it will support and insulate the inner transfer pipe and auxiliary transfer extension. It should be noted that the end of auxiliary transfer pipe extension 78 can be threaded as shown at 84 to suitably receive other pipes or can have any suitable connector means which would allow other pipes to be fastened, coupled or secured so that fluids can readily flow through the inner transfer pipe and the auxiliary transfer extension. It should be noted that the area between the aperture 75 and the auxiliary transfer extension 78 is preferably sealed with a suitable sealant such as silicone as shown at 86. The fitting is completed by inserting or placing coupling seal assembly 88 of previously mentioned construction onto the recessed end of the inner transfer pipe 72. The other or extended end of the inner transfer pipe has an end seal 90 having the same construction as the end seals previously set forth in the above mentioned embodiments and placed therein the previously described manner.

Although the present invention has been described and illustrated in connection with the various embodiments, it is to be understood that modifications and variations may be resorted to without departing from the spirit of the invention, as those skilled in the art will readily understand. Such modifications and variations are considered to be within the purview and scope of the present invention as defined by the appended claims.

What is claimed is:

1. An insulated conduit fitting assembly comprising:
   an outer casing,
   an inner transfer pipe positioned within said outer casing,
   insulation material surrounding said inner transfer pipe,
   one end of said inner transfer pipe being recessed within said outer casing, said recessed end of said inner transfer pipe having a coupling assembly mounted thereon,
   at least one end of said inner transfer pipe extended beyond the edge of said outer casing,
   each said extended end of said inner transfer pipe cooperating with an end sealing ring,
   a support shell positioned within said outer casing and in direct bearing contact therewith for reinforcing said outer casing, said support shell being separated from said coupling assembly and said end seal by insulation material,
   anchor means secured to said inner transfer pipe and extending beyond the periphery of the outer casing,
   said anchor means also secured to said support shell.

2. The insulated conduit fitting assembly as claimed in claim 1 wherein a cylindrical section is secured to the outer periphery of said anchor means.

3. An insulated conduit fitting assembly as claimed in claim 1 wherein said coupling assembly comprises a metal coupling, an insulated lock block constructed to fit in cooperation with said coupling, and a resilient end sealing ring being seated upon the inner surface of said outer casing.

4. An insulated conduit fitting assembly as claimed in claim 3 wherein said metal coupling has a plurality of annular grooves having a high-temperature sealing ring and an O-ring mounted therein.

5. An insulated conduit fitting assembly as claimed in claim 1 wherein said outer casing is L-shaped and said inner transfer pipe is arcuate.

6. An insulated conduit fitting assembly as claimed in claim 1 wherein said outer casing is T-shaped and said inner transfer pipe is T-shaped.

7. An insulated conduit fitting assembly as claimed in claim 1 wherein said inner transfer pipe has a bell shaped end of greater diameter than its other end and said casing and said shell comprise a plurality of sections of different diameters.

* * * * *